(12) United States Patent
Hilker et al.

(10) Patent No.: US 7,892,131 B2
(45) Date of Patent: Feb. 22, 2011

(54) METHOD AND APPARATUS FOR LUBRICATING A DIFFERENTIAL IN AN AXLE ASSEMBLY

(75) Inventors: Gregory J. Hilker, Canton, MI (US); Gregory E. Woodside, Troy, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 740 days.

(21) Appl. No.: 11/779,048

(22) Filed: Jul. 17, 2007

(65) Prior Publication Data

US 2009/0023531 A1    Jan. 22, 2009

(51) Int. Cl.
*F16H 57/04* (2010.01)

(52) U.S. Cl. ...................................... 475/160
(58) Field of Classification Search .................. 475/160
See application file for complete search history.

(56) References Cited

U.S. PATENT DOCUMENTS

| | | |
|---|---|---|
| 1,631,217 A | 6/1927 | Matthews |
| 2,015,108 A | 9/1935 | Harper |
| 2,147,145 A | 2/1939 | Carlson et al. |
| 2,237,900 A | 4/1941 | Bundy et al. |
| 2,240,118 A | 4/1941 | Matthews |
| 3,138,222 A | 6/1964 | Dames |
| 3,182,527 A * | 5/1965 | Bryan ......................... 475/160 |
| 4,227,427 A | 10/1980 | Dick |
| 4,274,298 A | 6/1981 | Ostrander |
| 5,232,291 A | 8/1993 | Kuan |
| 5,273,136 A | 12/1993 | Martin et al. |
| 5,709,135 A * | 1/1998 | Baxter ......................... 74/607 |
| 5,809,845 A * | 9/1998 | Shimizu ................... 74/606 R |
| 6,299,561 B1 * | 10/2001 | Kramer et al. ............. 475/160 |
| 6,997,284 B1 | 2/2006 | Nahrwold |
| 7,025,702 B2 | 4/2006 | Saito et al. |
| 7,160,219 B2 | 1/2007 | Oates |
| 7,229,376 B1 * | 6/2007 | Irwin ......................... 475/160 |

FOREIGN PATENT DOCUMENTS

| | | |
|---|---|---|
| GB | 1115446 A | 5/1968 |
| JP | 05-106710 A | 4/1993 |
| JP | 2002-181169 A | 6/2002 |
| KR | 20-1998-0003905 U | 3/1998 |

* cited by examiner

*Primary Examiner*—Ha D. Ho
(74) *Attorney, Agent, or Firm*—Harness, Dickey & Pierce, P.L.C.

(57) ABSTRACT

A method for lubricating an axle assembly can include: coupling a pair of bearing to opposite ends of a differential housing; placing the differential housing into a carrier housing assembly such that the bearings support the differential housing on the carrier housing assembly for rotation about a first axis; collecting a lubricant proximate a side of one of the bearings opposite the differential housing; and rotating the differential housing about the first axis to cause the one of the bearings to move a portion of the collected lubricant through the differential housing. A related axle assembly is also provided.

30 Claims, 4 Drawing Sheets

METHOD AND APPARATUS FOR LUBRICATING A DIFFERENTIAL IN AN AXLE ASSEMBLY

INTRODUCTION

The present disclosure generally relates to axle assemblies. More particularly, the present disclosure relates to a method for lubricating a differential in an axle assembly and a related axle assembly.

BACKGROUND

Automotive drive axles can include an axle housing, a pair of axle shafts, an input pinion assembly, and a differential assembly that can include a differential housing, a ring gear mounted to the differential housing and a differential gear set disposed within the differential housing. The axle shafts can be received in and rotatably supported by the axle housing for rotation about a first axis. The input pinion assembly can be received in and rotably supported by the axle housing for rotation about a second axis. The pinion assembly can be meshingly engaged with the ring gear. Accordingly, the ring gear and input pinion assembly can be arranged with a hypoid gear configuration. Alternatively, the ring gear and pinion may be of any other conventional type. The differential housing can be rotatably mounted to the axle housing via a pair of roller bearings for rotation about the first axis. The differential gear set can include a pair of side gears, each coupled for rotation with a respective one of the axle shafts, and a plurality of mating differential pinion gears. The side gears can be rotatably supported within the differential housing. The pinion gears can be coupled to and rotatably supported by the differential housing. The pinion gears can be meshingly engaged with the side gears such that rotation of the differential housing causes corresponding rotation of the bevel side gears. Accordingly, the side gears and pinion gears can be arranged in a bevel gear configuration. In this manner, an automotive drive axle can be configured to transmit rotary power supplied to the pinion assembly through the differential assembly to the axle shafts in a predetermined manner.

Providing adequate lubrication to the components of an automotive drive axle is important to the operation and longevity of the automotive drive axle. For example, it is important to properly lubricate the various gears and pinions of the automotive axle assembly including their teeth and the bearing surfaces on which they are supported for rotation. Many automotive axle assemblies utilize splash lubrication to lubricate the various gears and pinions wherein a rotating component, such as the ring gear and/or the differential housing rotates through a liquid lubricant that is disposed in a sump that is defined by the axle housing. Lubricant clings the to the rotating component as it passes through the lubricant in the sump and is thereafter slung outwardly from the rotating component due to centrifugal force.

Among the drawbacks of splash lubrication is the loss in operating efficiency associated with the churning of the lubricant that occurs to lubricate the components in the manner previously described. With increasing emphasis on vehicle fuel economy, improvements in the operating efficiency of automotive axle assemblies are becoming increasingly important. One approach to achieving improvements in operating efficiency that we have considered is to reduce the quantity of lubricant in the sump of the axle housing to lower the level of the liquid lubricant stored therein. Lowering the lubricant level reduces the rotational spin loss that occurs when the rotating component passes through the liquid lubricant in the sump. A reduction in the quantity of liquid lubricant also offers other benefits, including material cost savings and reduced life-cycle pollution. However, reduced quantity of liquid lubricant may not provide adequate lubrication where the axle assembly relies solely on conventional splash lubrication techniques.

SUMMARY

In one form, the present teachings provide an axle assembly that can include a carrier housing assembly, a differential housing, first and second bearings, a differential gear set, a ring gear, a pinion and a lubricant. The carrier housing assembly defines a cavity. The differential housing is received in the cavity. The first and second bearings are disposed between the carrier housing and the differential housing and support the differential housing for rotation about a first axis. The differential gear set is received in the differential housing. The ring gear is coupled to the differential housing. The pinion is received in the cavity and supported for rotation about a second axis that is perpendicular to the first axis. The lubricant is received in the cavity. The first bearing includes an outer race, an inner race and a plurality of rollers between the outer race and the inner race. A lubricant reservoir is formed by at least one of the outer race and the carrier housing. The lubricant reservoir is disposed on a first side of the first bearing opposite the differential gear set. The lubricant reservoir extends at least partially about the first bearing and collects a first portion of the lubricant therein. An oil gallery is formed through the differential housing. The first portion of the lubricant is moved by the first bearing when the differential housing is rotating about the first axis such that the first portion of the lubricant flows through the first bearing and into the oil gallery.

In another form, the present teachings provide a method for operating an axle assembly that includes a carrier housing assembly that defines a cavity, a differential housing received in the cavity, first and second bearings disposed between the carrier housing assembly and the differential housing and supporting the differential housing for rotation about a first axis, a differential gear set received in the differential housing, a ring gear coupled to the differential housing, a pinion received in the cavity and supported for rotation about a second axis that is perpendicular to the first axis, and a lubricant received in the cavity. The method can include: collecting a first portion of lubricant in a lubricant reservoir adjacent the first bearing; and rotating the differential housing about the first axis to cause the first portion of lubricant to be moved through the first bearing and into an oil gallery in the differential housing, the first portion of lubricant flowing through the oil gallery to at least partially lubricate the differential gear set.

In yet another form, the present teachings provide a method for lubricating an axle assembly. The method can include: coupling a pair of bearing to opposite ends of a differential housing; placing the differential housing into a carrier housing assembly such that the bearings support the differential housing on the carrier housing assembly for rotation about a first axis; providing an oil gallery in the differential housing on a proximate side of one of the bearings; collecting a lubricant in a lubricant reservoir proximate a side of one of the bearings opposite the differential housing; and rotating the differential housing about the first axis to cause the one of the bearings to move a portion of the collected lubricant through the differential housing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
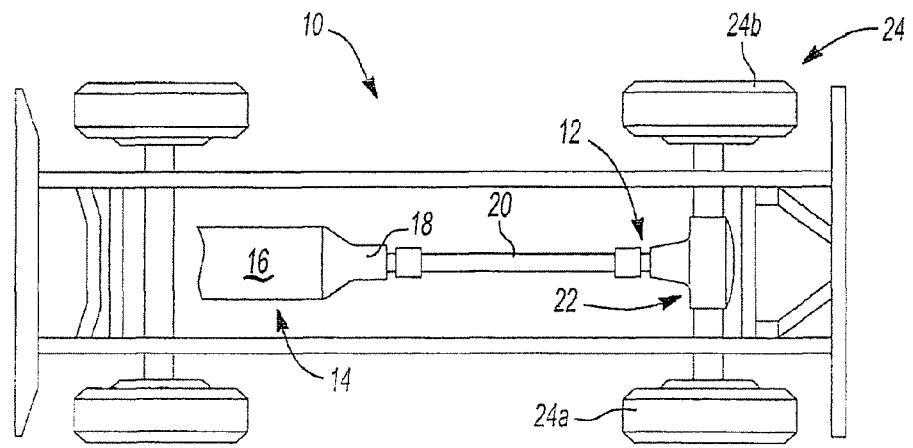
FIG. 1 is a schematic illustration of a vehicle having an axle assembly constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportion in a predetermined manner to the left and right rear wheels 24a and 24b, respectively.

Figure 2:
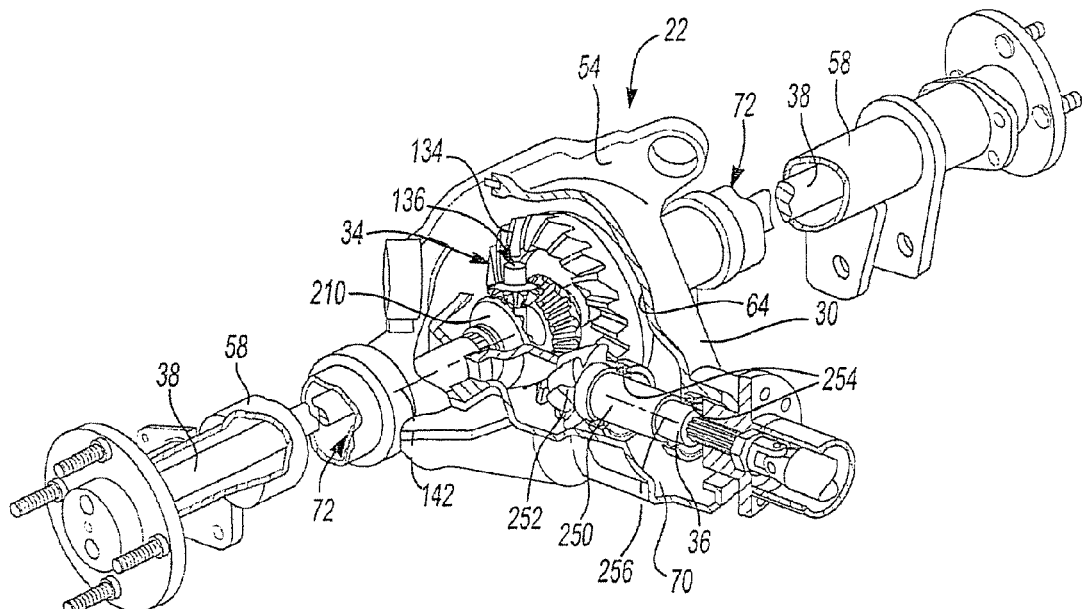
FIG. 2 is a partially broken-away perspective view of a portion of the vehicle of FIG. 1 illustrating the axle assembly in more detail.
Figure 3:
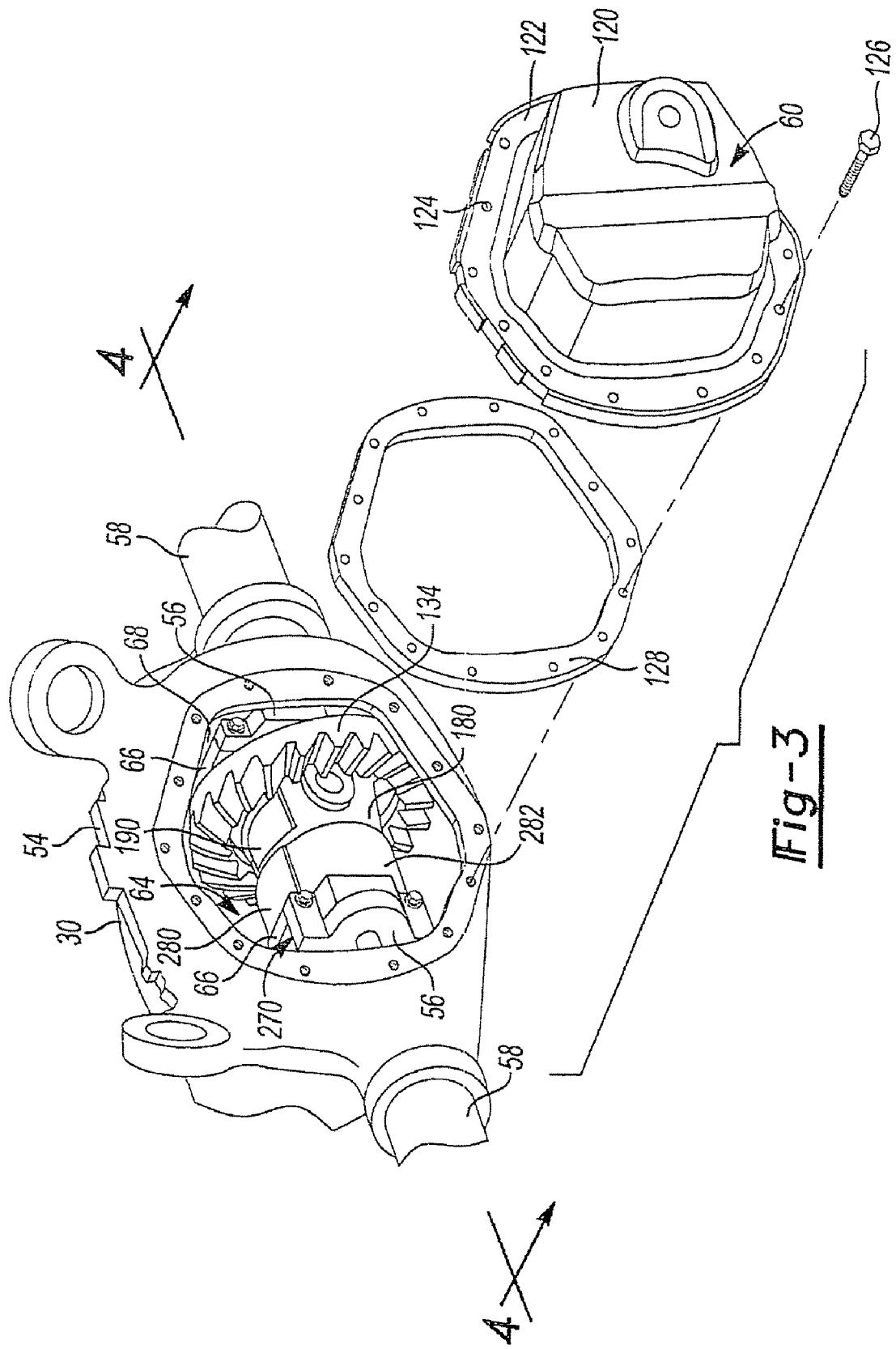
FIG. 3 is an exploded perspective view of a portion of the rear of the axle assembly shown in FIG. 1.
Figure 4:
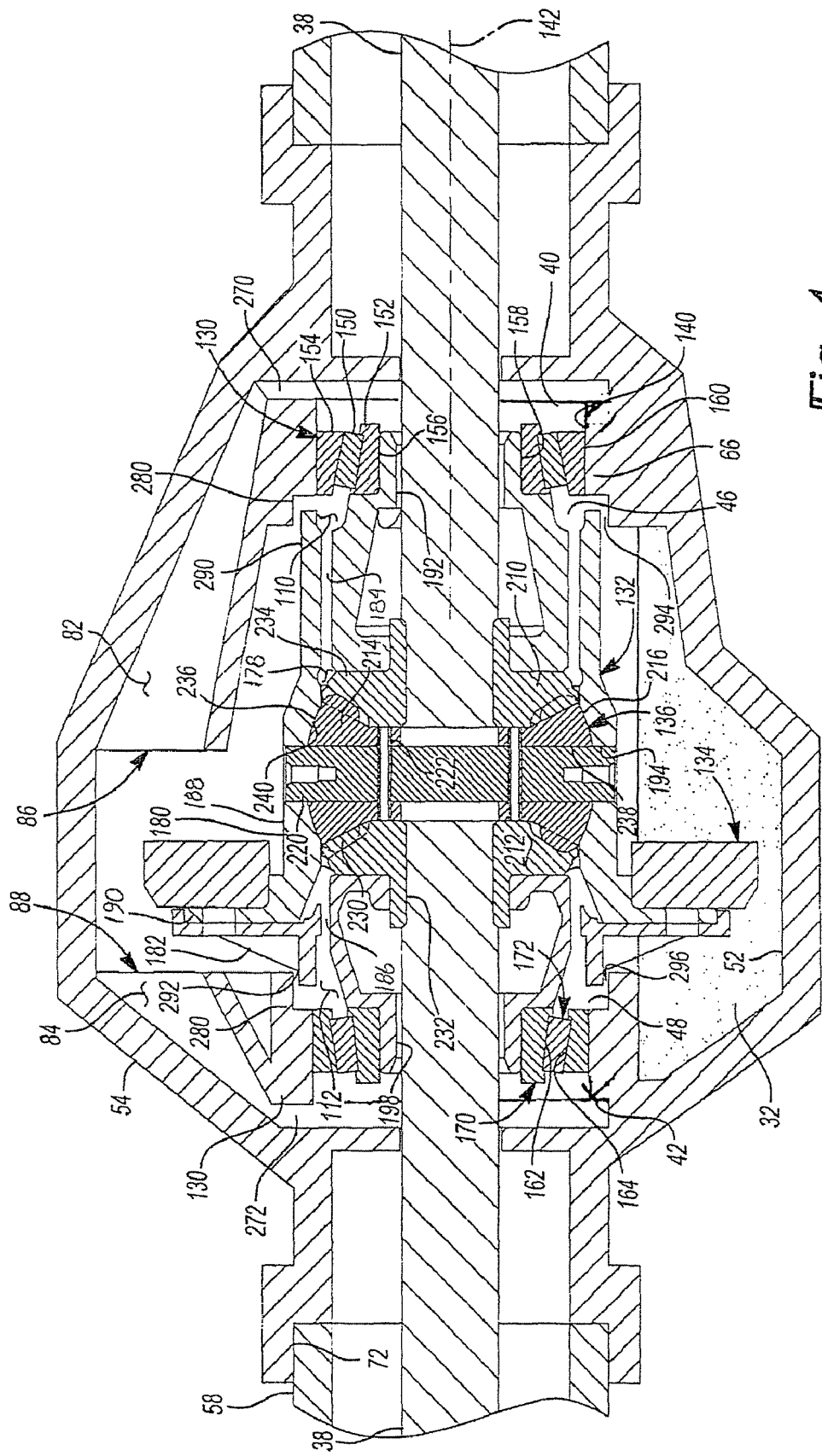
FIG. 4 is a partial cross-sectional view of the axle assembly shown in FIG. 1 taken longitudinally through the axle assembly.

With reference to FIGS. 2 through 4, the rear axle 22 can include an axle housing assembly 30 partially filled with a lubricant 32, a differential 34, an input pinion assembly 36, a pair of axle shafts 38, first and second lubricant reservoirs 40 and 42, and first and second oil galleries 46 and 48. In the particular example provided, the axle housing assembly 30 defines a lubricant sump 52 and includes a carrier housing 54, a pair of bearing caps 56, a pair of axle tubes 58 and a cover 60. As best seen in FIG. 4, the lubricant sump 52 can be generally disposed along the bottom of the axle housing assembly 30 to collect a portion of the lubricant 32 and be formed by the carrier housing 54 and the cover 60. The lubricant 32 can be of any conventional type associated with the rear axle 22.

The carrier housing 54 can define an internal cavity 64, a pair of bearing journals 66, a differential aperture 68, which can intersect the internal cavity 64 from a first side of the carrier housing 54, a pinion aperture 70, which can intersect the internal cavity from a second side of the carrier housing 54 opposite the differential aperture 68, a pair of axle tube apertures 72 that can intersect the opposite lateral sides of the internal cavity 64, and first and second lubricant passageways 82 and 84.

The first and second lubricant collection passageways 82 and 84 can be disposed between the differential 34 and first and second lubricant reservoirs 40 and 42, respectively. The first and second lubricant collection passageways 82 and 84 are configured to deliver lubricant to the first and second lubricant reservoirs 40 and 42 in a manner that will be described in more detail, below. To this end, the first and second lubricant collection passageways 82 and 84 can have collection openings 86, 88 disposed along the top, center portion of the carrier housing 54 and, as in the example provided, proximate to the differential 34.

The bearing caps 56 can be removably coupled to the bearing journals 66. The axle tubes 58 can be received in the axle tube apertures 72 and can be fixedly coupled to the carrier housing 54. The cover 60 can include a body portion 120 and a flange portion 122 that can be coupled to the carrier housing 54. The flange portion 122 can extend about the body portion 120 and in the particular example provided, includes a plurality of through holes 124 that permit the cover 60 to be removably coupled to the carrier housing 54 via a plurality of threaded fasteners 126. It will be appreciated that a gasket 128 or a sealant (not shown) can be employed to seal the interface between the cover 60 and the carrier housing 54. Accordingly, the cover 60 can cooperate with the carrier housing 54 to define the lubricant sump 52 along a lower portion of the axle housing assembly 30 as previously described.

With particular reference to FIG. 4, the differential 34 can include a pair of tapered roller bearings 130 for rotatably supporting differential 34 within internal cavity 64, a case 132, a ring gear 134, which can be coupled to the case 132, and a gearset 136 that can be housed in the case 132. The differential 34 can be received into the internal cavity 64 through the differential aperture 68. The tapered roller bearings 130 can be received within apertures 140 formed by the bearing journals 66 and the bearing caps 56, which cooperate to support opposite ends of the differential 34 for rotation in the internal cavity 64 about a first rotational axis 142. The tapered roller bearings 130 can be of a conventional type and can include a plurality of rollers 150 interposed between inner races 152 and outer races 154. The inner races 152 can include inner surfaces 156 adapted to receive corresponding outer surfaces 158 of the case 132. The inner surfaces 156 can have a diameter D2 smaller than diameter D1 of outer surfaces 158 such that the inner surfaces 156 and the outer surfaces 158 work together to provide a press fit between the tapered roller bearings 130 and the case 132. As such, the inner races 152 can rotate along with the case 132 about the first rotational axis 142. The outer races 154 can include outer surfaces 160 that are fixedly received within the apertures 140 formed by the bearing caps 56 and the bearing journals 66 to fixedly position the outer races 154.

The rollers 150 can be in rolling contact with inner bearing surfaces 162, 164 associated with the inner and outer races 152 and 154, respectively. As such, the rollers 150 can rotate in response to rotation of the inner races 152. The rollers 150 rotate about axes that form an angle with the first rotational axis 142. It will be appreciated that the rollers 150 can rotate at rotational speeds many times that of the inner races 152. In contrast to the rollers 150 and the inner races 152, the outer races 154, being fixedly received within the housing assembly 30, do not rotate in response to the rotation of the differential 34.

The tapered roller bearings 130 can further include outer faces 170 and inner faces 172 defined by the rollers 150, the inner races 152 and the outer races 154. The outer faces 170 are associated with the sides of the tapered roller bearings 130 opposite the differential gear set 136 and having the narrow diameter formed by the axes of rollers 150. Conversely, the inner faces 172 are associated with the opposite sides of the tapered roller bearings 130 having the larger diameter formed by the axes of rollers 150. The tapered roller bearings 130 can be disposed on opposite ends of the differential 34 in the manner previously described such that the outer faces 170 are in fluid communication with the first and second lubricant reservoirs 40 and 42 and the inner faces 172 are in fluid communication with the first and second oil galleries 46 and 48. In this manner, the tapered roller bearings 130 are operable to deliver a portion of the lubricant 32 within the first and second lubricant reservoirs 40 and 42 to the first and second oil galleries 46 and 48 in a manner that will be described in more detail below.

Referring still to FIG. 4, the case 132 can define an internal cavity 178 and can include a differential case 180, a differential cover 182, and a first and second pair of delivery channels 184 and 186. The differential case 180 can have a body 188 and a flange 190 that can be disposed generally perpendicular to the first rotational axis 142 of the differential 34. The body 188 can define a first axle bore 192 and a pinion shaft bores 194. The first axle bore 192 can be disposed about the first rotational axis 142 of the differential 34 and can intersect the internal cavity 178 on an end of the body 184 opposite the flange 186. The pinion shaft bore 194 can extend through the body 188 along an axis that is generally perpendicular to the first rotational axis 142 of the differential 34.

The differential cover 182 can be coupled to the differential case 180 to substantially close an end of the differential case 180 opposite the first axle bore 192. The differential cover 182 can define a second axle bore 198 that can be arranged about the first rotational axis 142 of the differential 34. The first and second axle bores 192 and 198 can be sized and shaped to slidably engage an end of an associated one of the axle shafts 38 (FIG. 2) in a conventional manner that permits drive torque to be transmitted between the case 132 and the axle shafts 38 (FIG. 2).

The first pair of delivery channels 184 can extend axially through the differential case 180 to provide fluid communication between the internal cavity 178 and the first oil gallery 46. Similarly, the second pair of delivery channels 186 can extend axially through the differential cover 182 to provide fluid communication between the internal cavity 178 and the second oil gallery 48. It will be appreciated that the first and second pairs of delivery channels 184 and 186 have openings on one end proximate the internal cavity 178 and on an opposite end proximate a corresponding one of the first and second oil galleries 46 and 48.

Accordingly, the case 132 is configured to deliver lubricant to the differential gear set 136 disposed within the internal cavity 178 in a manner that will be described in more detail below. It will also be appreciated that while the case 132 is shown to have a first and second pair of delivery channels 184 and 186, the case 132 may further include additional delivery channels to direct the flow of lubricant from the first and second oil galleries 46 and 48 to the differential gear set 136. Alternatively, the case 132 may include a single delivery channel associated with one of the first and second oil galleries 46 and 48.

The differential gear set 136 can be conventional in its construction and as such, needs not be discussed in significant detail herein. Briefly, the differential gear set 136 can include first and second bevel side gears 210 and 212, first and second bevel pinions 214 and 216, a pinion shaft 220 and a pair of collars 222. The first and second bevel side gears 210 and 212 can be received in the internal cavity 178 on opposite sides of the differential case 180 such that they are aligned about the first rotational axis 142 of the differential 34 and abutted against the differential case 180 and the differential cover 182, respectively.

The first and second bevel side gears 210 and 212 can include a plurality of gear teeth 230 and a central splined aperture 232 that is configured to non-rotatably but axially slidably engage a corresponding one of the axle shafts 38 (FIG. 2) to permit drive torque to be transmitted between the first and second bevel side gears 210 and 212 and the axle shafts 38 (FIG. 2).

The first and second bevel pinions 214 and 216 can include gear teeth 234 that can meshingly engage the first and second bevel side gears 210 and 212, a surface 236 opposite the gear teeth 234 that can be configured to engage the differential case 180 and through bores 238. The opposite surface 236 is arcuate in shape and conforms to the arcuate recesses 240 that are formed in the internal cavity 178 of the differential case 180 at the locations where pinion shaft bores 194 intersect the interior side of the wall of the differential case 180.

The pinion shaft 220 is adapted to rotatably support first and second bevel pinions 214 and 216 within the differential case 180. Accordingly, the pinion shaft 220 can be received in the pinion shaft bore 194 of the differential case 180 and through the through bores 238 in the first and second bevel pinions 214 and 216. The collars 222 are adapted to slidingly support first and second bevel pinions 214 and 216. Accordingly, the collars 222 can be disposed in the internal cavity 178 radially inward of the first and second bevel pinions 214 and 216 and can be coupled to the pinion shaft 220.

As best seen in FIG. 2, the input pinion assembly 36 can conventionally include an input shaft 250 and an input pinion 252 that can be coupled for rotation with the input shaft 250. The input pinion assembly 36 can be received into the carrier housing 54 through the pinion aperture 70 such that the input pinion 252 is meshingly engaged to the ring gear 134. A pair of bearings 254 can be coupled to the carrier housing 54 and the input shaft 250 and can support the input pinion assembly 36 for rotation about a second rotational axis 256 that can be generally perpendicular to the first rotational axis 142. An end of the input shaft 250 opposite the input pinion 252 can be adapted to be coupled to a driveline component, such as the propshaft 20 (FIG. 1), to receive rotary power therefrom.

Each of the axle shafts 38 can be conventionally received through an associated one of the axle tubes 58 and can be coupled for rotation with a corresponding one of the first and second beveled side gears 210 and 212, as previously described. Accordingly, it will be appreciated that rotary power input to the axle 22 via the input pinion assembly 36 is transmitted through the ring gear 134, to the case 132 and the differential gear set 136 and output to the axle shafts 38 to provide propulsive power to the left and right rear wheels 24a and 24b (FIG. 1).

Referring to FIG. 4, the first and second lubricant reservoirs 40 and 42 can be disposed within the carrier housing 54 on opposite lateral ends of the differential 34 along at least a portion of a corresponding one of the outer faces 170 of the tapered roller bearings 130. The first and second lubricant reservoirs 40 and 42 are configured to receive lubricant from the first and second lubricant passageways 82 and 84, respectively, and to deliver the collected lubricant to a corresponding one of the outer faces 170 of the tapered roller bearings 130. Accordingly, the first lubricant reservoir 40 can include a first inlet 270 disposed along an upper portion of the first lubricant reservoir 40 to provide fluid communication between the first lubricant reservoir 40 and the first lubricant passageway 82. Similarly, the second lubricant reservoir 42 can include a second inlet 272 disposed along an upper portion of the second lubricant reservoir 42 to provide fluid communication between the second lubricant reservoir 42 and the second lubricant passageway 84.

The first oil gallery 46 can be disposed between one end of the differential 34 and axle housing assembly 30. Similarly, the second oil gallery 48 can be disposed between an opposite end of the differential 34 and axle housing assembly 30. The first and second oil galleries 46 and 48 are configured to receive lubricant from a corresponding one of the tapered roller bearings 130 and to deliver the lubricant to the first and second pairs of delivery channels 184 and 186, respectively, in a manner that will be described in more detail below. Accordingly, at least a portion of the first and second oil galleries 46 and 48 are disposed about a corresponding one of the inner faces 172 of the tapered roller bearings 130.

In the particular example provided, the bearing caps 56 can work together with the carrier housing 54 and the differential 34 to define the first and second oil galleries 46 and 48. To this end, the carrier housing 54 can further include a pair of axially extending base shrouds 280 and the bearing caps 56 can further include a complementary pair of axially extending cover shrouds 282. The base shrouds 280 and the cover shrouds 282 can each extend between a corresponding bearing and outer surfaces 284, 286 of the differential case 180 along rotational axis 142 to thereby define annular volumes 110, 112 associated with the first and second oil galleries 46 and 48. The base shrouds 280 and the cover shrouds 282 can each be configured to receive outer surfaces 290, 292 of the differential case 180 and the differential cover 182, as shown, yet permit free rotation of the differential 34 by providing annular clearance gaps 294, 296. It will be appreciated that the annular clearance gaps 294, 296 can be sufficiently large to ensure free rotation of the differential 34, yet appropriately sized to limit the flow of pressurized lubricant within the first and second oil galleries 46 and 48 through the annular clearance gaps 294, 296.

With particular reference to FIG. 4, the operation of the rear axle 22 having an improved lubrication system will now be described. The carrier housing 54 can be filled with a quantity of the lubricant 32 sufficient to fill the lubricant sump 52 and thereby immerse a lower portion of the ring gear 134. As the ring gear 134 rotates through the portion of the lubricant 32 disposed in the lubricant sump 52, lubricant clings to the ring gear 134 and is carried from the lubricant sump 52 and subsequently dispersed within the first and second lubricant collection passageways 82 and 84 via the collection openings 86, 88 by way of centrifugal force. The portion of the lubricant 32 within the first and second lubricant collection passageways 82 and 84 is delivered to a corresponding one of the first and second lubricant reservoirs 40 and 42 via first and second inlets 270, 272, respectively, by way of gravitational forces. Subsequently, lubricant collects within the first and second lubricant reservoirs 40 and 42 where it is dispersed about a corresponding portion of the outer faces 170 of the tapered roller bearings 130. As the tapered roller bearings 130 rotate along with the differential 34, lubricant present along the outer faces 170 is drawn in through the tapered roller bearings 130 by the rollers 150 and delivered to the first and second oil galleries 46 and 48 located on an opposite side of the tapered roller bearings 130 associated with the inner faces 172. It will be appreciated that under normal vehicle operating conditions, the capacity of the tapered roller bearings 130 to deliver lubricant to the first and second oil galleries 46 and 48 is sufficient to generate pressure within the first and second oil galleries 46 and 48, notwithstanding the small loss of pressurized lubricant through the annular clearance gaps 294, 296. At least a portion of the pressurized lubricant within the first and second oil galleries 46 and 48 travels through the first and second delivery channels 184 and 186 to the internal cavity 178 where it reaches the first and second bevel side gears 210 and 212 and first and second bevel pinions 214 and 216. Lubricant reaching the internal cavity 178 is drawn in to the arcuate recesses 240 and the gear teeth 230, 234 of the first and second bevel side gears 210 and 212 and the first and second bevel pinions 214 and 216, respectively. Lubricant within the differential gear set 136 will eventually exit the differential gear set 136 and the internal cavity 178 under gravitational and centrifugal forces and travel to the lubricant sump 52 to complete the lubrication cycle. In this manner, the rear axle 22 is operable to provide improved lubrication of the differential gear set 136 associated with a differential 34.

Figure 5:
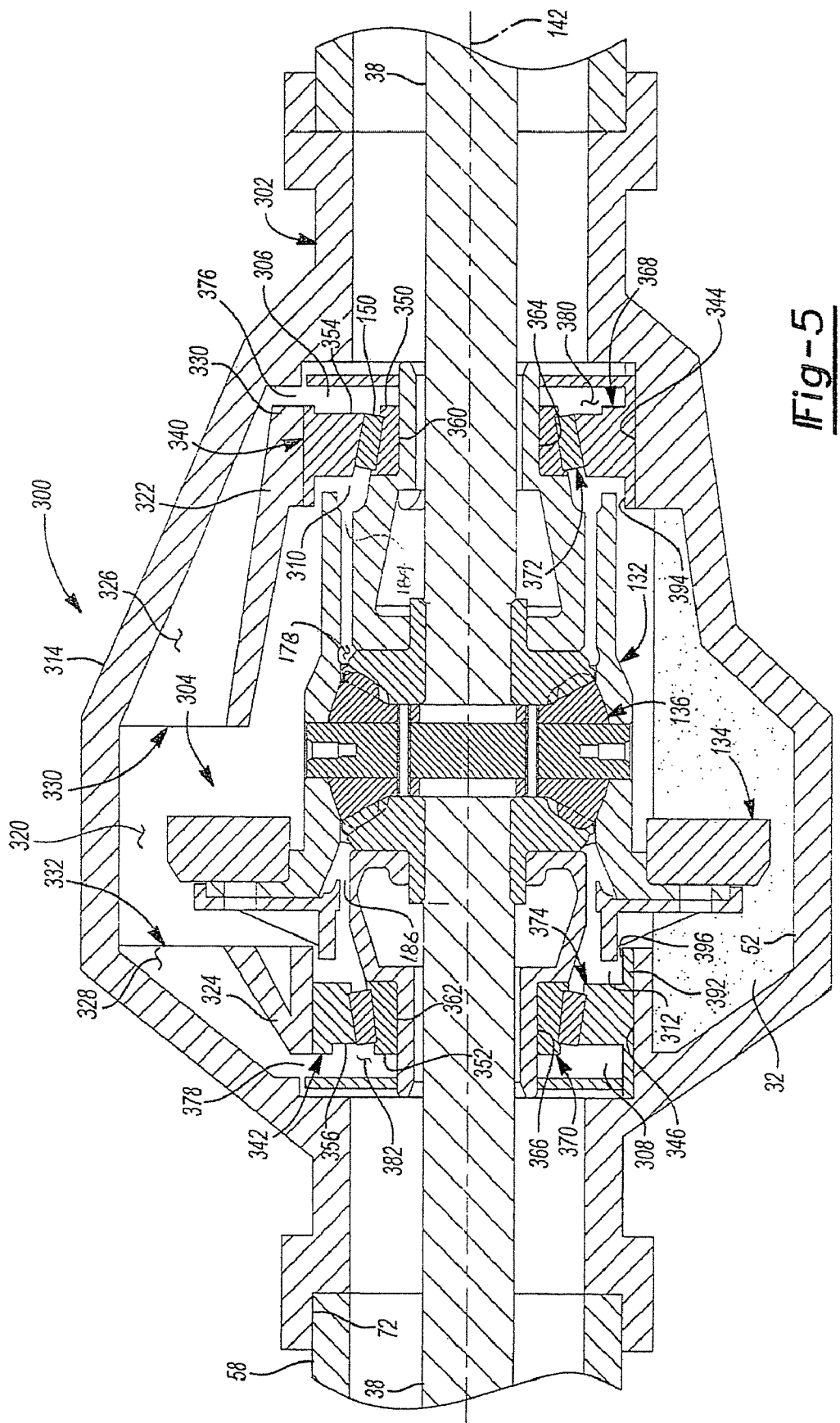
FIG. 5 is a partial cross-sectional view of another axle assembly constructed in accordance with the teachings of the present disclosure.

Referring to FIG. 5, another rear axle 300 in accordance with the present disclosure is illustrated. In view of the substantial similarity between the components and associated with rear axle 300 and rear axle 22, like reference numerals are used hereinafter and in the drawings for like components, while new reference numerals are used to define components that are new or have been modified. Accordingly, rear axle 300 can include an axle housing assembly 302 partially filled with lubricant 32, a differential 304, an input pinion assembly 36, a pair of axle shafts 38, first and second lubricant reservoirs 306 and 308, and first and second oil galleries 310 and 312. The axle housing assembly 302 can define the lubricant sump 52 in the manner previously described and can include a carrier housing 314, bearing caps 316, 318 (not shown), a pair of axle tubes 58, and a cover 60.

The carrier housing 314 can define an internal cavity 320, bearing journals 322, 324, a differential aperture 68, a pinion aperture 70, a pair of axle tube apertures 72, and first and second lubricant passageways 326 and 328. The bearing journals 322, 324 can be disposed on opposite lateral ends of the carrier housing 314 and can be configured to support the differential 304 for rotation within the internal cavity 320. The first and second lubricant passageways 326 and 328 can be disposed between the differential 304 and the first and second lubricant reservoirs 306 and 308, respectively. The first and second lubricant collection passageways 326 and 328 are each configured to deliver lubricant to the first and second lubricant reservoirs 306 and 308 in a manner that will be described in more detail, below. To this end, the first and second lubricant collection passageways 326 and 328 can have collection openings 330, 332 disposed along the top, center portion of the carrier housing 314 and, as in the example provided, proximate to the differential 304.

The bearing caps 316, 318 can be of a conventional type and can be removably coupled to the bearing journals 322, 324, respectively. Accordingly, each of the bearing caps 316, 318 can cooperate with the corresponding one of the bearing journals 322, 324 to support opposite ends of the differential for rotation within the internal cavity 320 of the carrier housing 314 about a first rotational axis 142. The axle tubes 58 can be received in the axle tube apertures 72 and can be fixedly coupled to the carrier housing 314 in the manner previously described for the carrier housing 54. Similarly, the cover 60 can be coupled to the carrier housing 314 via a plurality of threaded fasteners.

The differential 304 can include a case 132, a ring gear 134 coupled to the case 132, a differential gear set 136 housed in the case 132, and tapered roller bearings 340, 342. The differential 304 can be received into the internal cavity 320 through the differential aperture 68 as previously described. The case 132, the ring gear 134 and the differential gear set 136 can retain all of the features and functions previously described.

The tapered roller bearings 340, 342 can be received within apertures 344, 346 defined by the bearing journals 322, 324 and the bearing caps 316, 318 and can include a plurality of rollers 150 interposed between inner races 350, 352 and outer races 354, 356. The inner races 350, 352 can include inner surfaces 360, 362 adapted to receive the corresponding outer surfaces 364, 366 of the case 132. The outer races 354, 356 can be fixedly received within the apertures 344, 346. The inner races 350, 352, the rollers 150, and the outer races 354, 356 can define can define outer faces 368, 370 associated with the sides of the tapered roller bearings 340, 342 having the narrow diameter formed by the axes of the rollers 150. Similarly, the inner races 350, 352; the rollers 150; and the outer races 354, 356 can define inner faces 372, 374 associated with the opposite sides of the tapered roller bearings 340, 342 having the larger diameter formed by the axes of the rollers 150.

The input pinion assembly 36 can be received into the carrier housing 314 through the pinion aperture 70 such that the input pinion 252 is meshingly engaged to the ring gear 134 as previously described. Similarly, each of the axle shafts can be received through an associated one of axle tubes and can be coupled for rotation with the differential gear set 136 of the differential 304.

The first and second lubricant reservoirs 306 and 308 can be disposed within the carrier housing 314 on opposite lateral ends of the differential 304 along at least a portion of the corresponding one of the outer faces 368, 370 of the tapered roller bearings 340, 342. The first and second lubricant reservoirs 306 and 308 can be configured to receive lubricant from the first and second lubricant passageways 326 and 328 and collect the lubricant proximate the outer faces 368, 370 of tapered roller bearings 340, 342. Accordingly, the outer races 354, 356 can define the first and second lubricant reservoirs 306 and 308 as in the example provided. To this end, outer races 354, 356 can include inlets 376, 378 disposed along an upper portion of the outer races 354, 356 proximate to the first and second lubrication collection passageways 326 and 328. In this manner, the outer races 354, 356 can define annular volumes 380, 382 that extend about at least a portion of the outer faces 368, 370.

The first and second oil galleries 310 and 312 can be disposed between the case 132 and the tapered roller bearings 340, 342 on opposite ends of the differential 304. To this end, the outer race 354 can further include a first shroud 390 that axially extends from the inner face 372 of the tapered roller bearing 340, as in the example provided. Similarly, the outer race 356 can further include a second shroud 392 that axially extends from the inner face 374 of the tapered roller bearing 342. The first and second shrouds 390, 392 may be configured to receive a corresponding portion of the case 132 as shown, yet permit free rotation of differential 304 by providing annular clearance gaps 394, 396. In this manner, the tapered roller bearings 340, 342 can cooperate with differential 304 to define the first and second oil galleries 310 and 312. It will be appreciated that the annular clearance gaps 394, 396 can be sufficiently large to ensure free rotation of differential 304, yet appropriately sized to limit the flow of pressurized lubricant within the first and second galleries 310 and 312 through annular clearance gaps 394, 396.

Referring still to FIG. 5, the operation of the rear axle 300 having an improved lubrication system will now be described. The carrier housing 314 can be filled with a quantity of lubricant 32 sufficient fill the lubricant sump 52 and thereby immerse the lower portion of the ring gear 134. The lubricant 32 can be of any conventional type associated with the rear axle 22. As the ring gear 134 rotates through the portion of lubricant 32 disposed in the lubricant sump 52, lubricant clings to the ring gear 134, is carried from the lubricant sump 52, and is subsequently dispersed within the first and second lubricant collection passageways 326 and 328 by way of centrifugal force. Fluid within the first and second lubricant collection passageways 326 and 328 is delivered to tapered roller bearings 340, 342 by way of gravitational forces. Subsequently, a portion of the lubricant 32 collects within the annular volumes 380, 382 of the first and second lubricant reservoirs 306 and 308 where the lubricant 32 is dispersed about a portion of the outer faces 368, 370 of the tapered roller bearings 340, 342. As the tapered roller bearings 340, 342 rotate along with differential 304, lubricant present along the outer faces 368, 370 is drawn in through the tapered roller bearings 340, 342 by the rollers 150 and delivered to the first and second oil galleries 310 and 312 located on an opposite side of tapered roller bearings 340, 342 associated with the inner faces 372, 374. In this manner, the tapered roller bearings 340, 342 are operable to deliver sufficient quantities of lubricant to generate pressure within the oil first and second galleries 310 and 312, notwithstanding the small loss of pressurized lubricant through the annular clearance gaps 394, 396 present between the case 132 and the first and second shrouds 390 and 392. At least a portion of the pressurized lubricant within the first and second oil galleries 310 and 312 travels through the first and second delivery channels 184 and 186 to the internal cavity 178 where it reaches the differential gear set 136 and is drawn into the arcuate recesses 240 and the gear teeth 230, 234 associated with the differential gear set 136 as previously described. Lubricant within the differential gear set 136 will eventually exit the differential gear set 136 and the internal cavity 178 under gravitational and centrifugal forces and travel to the lubricant sump 52 to complete the lubrication cycle. In this manner, the rear axle 300 is operable to provide improved lubrication of the differential gear set 136 associated with the differential 304.

While a pair of tapered roller bearings 130 has been described and illustrated as rotatably supporting the carrier housing 54, those skilled in the art will appreciate that the invention, in its broader aspects, may be constructed somewhat differently. For example, any type of suitable bearing, including a ball bearing or a journal bearing, can be employed in lieu of tapered roller bearings.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
a carrier housing assembly including a carrier housing defining a cavity;
a differential housing received in the cavity;
first and second bearings each disposed between the carrier housing and the differential housing and including an inner race, an outer race, and a roller therebetween, the first and second bearings supporting the differential housing for rotation about a first axis and including a first side facing the carrier housing and a second, opposite side facing the differential housing;
a differential gear set received in the differential housing;
a ring gear coupled to the differential housing;
a pinion received in the cavity and supported for rotation about a second axis that is perpendicular to the first axis;
a lubricant sump defined by a first portion of the cavity and adapted to receive a lubricant;
a lubricant collection passage defined in part by a second portion of the cavity disposed on an opposite side of the differential gear set as the first portion of the cavity defining the lubricant sump;
a lubricant reservoir defined by at least one of the first side of the one of the first and second bearings and the carrier housing, the lubricant reservoir extending at least partially about the first side of the one of the first and second bearings and collecting a first portion of the lubricant therein;
an oil gallery formed through the differential housing and in fluid communication with the differential gear set and the second side of the one of the first and second bearings; and
an inlet channel fluidly coupling the lubricant collection passage with the lubricant reservoir;
wherein the first portion of the lubricant is moved into the lubricant collection passage by rotation of the ring gear such that the first portion of lubricant will flow through the inlet channel and into the lubricant reservoir; and
wherein the one of the first and second bearings is configured to draw the first portion of lubricant from the lubricant reservoir and into the oil gallery such that the drawn first portion of lubricant flows into and lubricates at least an element of the differential gear set when the differential housing is rotating about the first axis.

2. The axle assembly of claim 1, wherein the element includes at least one of a pinion gear and a side gear.

3. The axle assembly of claim 1, wherein the inlet channel is formed in a wall member of the carrier housing, the inlet channel having an outlet that is disposed proximate the first side of the one of the first and second bearings.

4. The axle assembly of claim 3, wherein the carrier housing assembly further includes a pair of bearing caps, the first and second bearings each being received between the carrier housing and one of the pair of bearing caps.

5. The axle assembly of claim 4, wherein the wall member defines at least a portion of the carrier housing.

6. The axle assembly of claim 3, wherein the inlet channel is cast into the wall member.

7. The axle assembly of claim 1, further comprising a second oil gallery formed through the differential housing on a side opposite the oil gallery, the second oil gallery being in fluid communication with a second side of the other of the first and second bearings, wherein a second portion of the lubricant in the cavity is moved by the ring gear and flows to a second oil reservoir formed between the first side of the other of the first and second bearings and the carrier housing, and wherein the other of the first and second bearings is configured to draw oil from the second reservoir when the differential housing is rotating about the first axis to cause the second portion of lubricant to flow through the second oil gallery and into contact with the differential gear set.

8. The axle assembly of claim 1, wherein the lubricant reservoir includes an annular cavity formed in the outer race.

9. The axle assembly of claim 1, wherein the first and second bearings are tapered roller bearings.

10. An axle assembly comprising:
a carrier housing assembly including a carrier housing defining a cavity;
a differential housing received in the cavity and including a differential gear set received therein;
a ring gear coupled to the differential housing;
first and second bearings disposed on opposite sides of the differential gear set between the carrier housing and the differential housing, the first and second bearings supporting the differential housing for rotation about a first axis and each including a first side facing the carrier housing and a second, opposite side facing respective opposite lateral sides of the differential housing;
a lubricant sump defined by a first portion of the cavity disposed on one side of the first axis and adapted to receive a lubricant; and
first and second lubricant flow paths comprising:
first and second lubricant collection passages defined in part by a second portion of the cavity disposed on an opposite side of the first axis as the first portion of the cavity defining the lubricant sump;
first and second lubricant reservoirs defined by at least respective first sides of the first and second bearings and a respective adjacent portion of the carrier housing, each lubricant reservoir extending at least partially about the first side of each of the first and second bearings, the lubricant reservoirs configured to collect lubricant therein;
first and second inlet channels fluidly coupling the respective first and second lubricant collection passages with the respective first and second lubricant reservoirs; and
first and second oil galleries having portions formed through the differential housing so as to place the respective second sides of the first and second bearings in fluid communication with the opposite lateral sides of the differential gear set;
wherein rotation of the ring gear moves lubricant from the sump such that first and second portions of the lubricant are delivered into the first and second flow paths via the first and second lubricant collection passages; and
wherein the first and second bearings are each configured to draw the respective first and second lubricant portions from the respective lubricant reservoirs into the respective oil galleries such that the drawn first and second lubricant portions each flow into and lubricate respective first and second elements of the differential gear set when the differential housing is rotating about the first axis.

11. The axle assembly of claim 10, wherein the first and second bearings are tapered roller bearings each having an outer race, an inner race and a roller therebetween, each roller disposed along a second axis orientated at an acute angle from the first axis such that each roller is disposed further from the first axis on the second side of the respective bearing than the first side; and
   wherein the orientation of the rollers facilitates the drawing of the lubricant portions from the respective reservoirs and into the respective oil galleries.

12. The axle assembly of claim 11, wherein the first and second tapered roller bearings are configured to include a capacity for delivering the first and second lubricant portions to the first and second oil galleries so as to generate pressure within the respective oil galleries.

13. The axle assembly of claim 10, wherein the first and second lubricant collection passages each include an opening disposed along a top, central portion of the cavity proximate an outer periphery of the ring gear.

14. The axle assembly of claim 10, wherein the first and second oil galleries include annular volumes disposed around the first axis.

15. The axle assembly of claim 10, wherein the first and second inlet channels are each disposed substantially perpendicular to the first axis.

16. The axle assembly of claim 10, further comprising a pinion received in the cavity and supported for rotation about a second axis that is perpendicular to the first axis.

17. The axle assembly of claim 16, wherein the first and second elements each include at least one of a pinion gear and a side gear.

18. The axle assembly of claim 10, wherein the first and second inlet channels are formed in part by respective outer wall members of the carrier housing, each inlet channel having an outlet disposed proximate respective first sides of the first and second bearings.

19. The axle assembly of claim 18, wherein the carrier housing assembly further includes a pair of bearing caps, the first and second bearings each being received between the carrier housing and one of the pair of bearing caps.

20. The axle assembly of claim 19, wherein the outer wall members each define at least a portion of one of the pair of bearing caps.

21. The axle assembly of claim 11, wherein the first and second lubricant reservoirs each include an annular cavity formed in the outer races of the respective first and second bearings.

22. An axle assembly comprising:
   a carrier housing defining a cavity;
   a differential assembly including a differential housing received in the cavity and a differential gear set supported by the differential housing;
   a bearing supporting the differential housing for rotation relative to the carrier housing about a first rotary axis, the bearing including a first side facing the carrier housing and a second side facing the differential housing;
   a lubricant sump defined by a first portion of the cavity disposed on one side of the first axis and which holds a lubricant; and
   a lubricant flow path including a lubricant collection passage, a lubricant reservoir, an inlet channel and an oil gallery, the lubricant collection passage is defined in part by a second portion of the cavity which is disposed on an opposite side of the first axis, the lubricant reservoir is defined by the first side of the bearing and an adjacent portion of the carrier housing, the lubricant reservoir extends at least partially about the first side of the bearing and is configured to collect lubricant therein, the inlet channel fluidly couples the lubricant collection passage with the lubricant reservoir, and the oil gallery includes a delivery channel that provides fluid communication between the second side of the bearing and the differential gear set;
   wherein rotation of the differential housing moves lubricant from the sump such that the lubricant is delivered into the lubricant flow path via the lubricant collection passage and flows from the inlet channel into the lubricant reservoir, and wherein the bearing is configured to draw the lubricant from the lubricant reservoir into the oil gallery in response to rotation of the differential housing such that the lubricant flows into the delivery channel and lubricates the differential gear set.

23. The axle assembly of claim 22 wherein the bearing is a tapered roller bearing having an outer race, an inner race and a plurality of rollers therebetween, wherein each roller is disposed along a second axis orientated at an acute angle relative to the first axis, and wherein the orientation of the rollers facilitates the drawing of the lubricant from the lubricant reservoir and into the oil gallery.

24. The axle assembly of claim 23, wherein the lubricant reservoir includes an annular cavity formed in the outer race of the bearing.

25. The axle assembly of claim 22 wherein the lubricant collection passage includes an opening disposed along a top, central portion of the cavity proximate an outer periphery of the differential housing.

26. The axle assembly of claim 22 wherein the oil gallery defines an annular volume that is disposed around the first axis.

27. The axle assembly of claim 22 wherein the inlet channel is disposed substantially perpendicular to the first axis.

28. The axle assembly of claim 22 further comprising a ring gear fixed to the differential housing for rotation about the first axis, and a pinion received in the cavity and supported for rotation about a second axis that is transverse to the first axis, and wherein the pinion is meshed with the ring gear.

29. The axle assembly of claim 22 wherein the inlet channel is formed in part by an outer wall member of the carrier housing, and wherein the inlet channel has an outlet disposed proximate the first side of the bearing.

30. The axle assembly of claim 22 further comprising:
   a second bearing supporting the differential housing for rotation relative to the carrier housing about the first axis, the second bearing including a first side facing the carrier housing and a second side facing the differential housing; and
   a second lubricant flow path including a second lubricant collection passage, a second oil reservoir, a second inlet channel fluidly coupling the second collection passage to the second oil reservoir, and a second oil gallery, the second lubricant collection passage is defined in part by the second portion of the cavity, the second lubricant reservoir is defined by the first side of the second bearing and an adjacent portion of the carrier housing and is configured to collect the lubricant therein, and the second oil gallery includes a second delivery channel that provides fluid communication between the second side of the second bearing and the differential gearset.

* * * * *